United States Patent [19]

Wilson et al.

[11] Patent Number: 5,411,926
[45] Date of Patent: May 2, 1995

[54] OLEFIN POLYMERIZATION CATALYST

[75] Inventors: Stanley E. Wilson, Houston; Richard A. Kemp, Stafford, both of Tex.

[73] Assignee: Shell Oil Company, Houston, Tex.

[21] Appl. No.: 193,302

[22] Filed: Feb. 8, 1994

Related U.S. Application Data

[63] Continuation of Ser. No. 969,652, Oct. 30, 1992, abandoned.

[51] Int. Cl.$^6$ .............................................. B01J 31/00
[52] U.S. Cl. .................................. 502/117; 502/119; 502/120; 502/122
[58] Field of Search ................ 502/122, 120, 119, 117

[56] References Cited

U.S. PATENT DOCUMENTS

| | | |
|---|---|---|
| 4,301,029 | 11/1981 | Caunt et al. . |
| 4,313,850 | 2/1982 | Kildayl et al. . |
| 4,330,649 | 5/1982 | Kioka et al. . |
| 4,458,027 | 7/1984 | Berge et al. . |
| 4,472,521 | 9/1984 | Band . |
| 4,497,905 | 2/1985 | Nozaki . |
| 4,508,843 | 4/1985 | Etherton et al. . |
| 4,511,669 | 4/1985 | Gessell ................. 502/110 |
| 4,540,679 | 9/1985 | Arzoumanidis et al. . |
| 4,710,482 | 12/1987 | Job . |
| 4,728,704 | 3/1988 | Chadwick et al. . |
| 4,728,705 | 3/1988 | Nestlerode et al. . |
| 4,866,022 | 9/1989 | Arzoumanidis et al. ........... 502/120 |
| 5,061,666 | 10/1991 | Chadwick et al. . |
| 5,081,090 | 1/1992 | Arzoumanidis et al. . |

*Primary Examiner*—Asok Pal
*Assistant Examiner*—Timothy H. Meeks
*Attorney, Agent, or Firm*—Otto O. Meyers, III

[57] ABSTRACT

A high activity olefin polymerization catalyst catalyzes the production of polymeric lower α-olefin having good properties. The catalyst is produced from an organoaluminum cocatalyst, a selectivity control agent and a novel olefin polymerization procatalyst which is prepared by contacting a tetravalent titanium halide, an optional inert diluent, an electron donor and a novel solid procatalyst precursor obtained by contacting (a) a carbonated magnesium alkoxide of the general formula $$Mg(OC\!\!-\!\!OR)_x(OR)_{2-x}$$
$$\phantom{Mg(}\|\phantom{C\!\!-\!\!OR)_x(OR}$$
$$\phantom{Mg(}O\phantom{C\!\!-\!\!OR)_x(OR}$$

wherein R is a hydrocarbyl group having up to 12 carbon atoms and x is a number from 0.1 to about 2; and (b) at least one halogenating compound which is a non-transition metal halogenated compound or non-metallic halogenated compound. A process for polymerizing one or more α-olefins utilizing the novel high activity polymerization catalyst.

14 Claims, No Drawings

OLEFIN POLYMERIZATION CATALYST

This is a continuation of application Ser. No. 07/969,652, filed Oct. 30, 1992, now abandoned.

FIELD OF THE INVENTION

This invention relates to a high activity olefin polymerization catalyst and to a method for the production thereof. More particularly, the invention relates to a magnesium-containing component of an olefin polymerization procatalyst, to the procatalyst and catalyst produced from that component and to the process of polymerizing olefins which employs such catalyst.

BACKGROUND OF THE INVENTION

High-activity catalysts which are produced from an organoaluminum compound, an electron donor, and a halogenated titanium compound on a solid carrier containing various magnesium compounds, are known for polymerizing α-olefins. The most commonly used magnesium compound is anhydrous magnesium chloride, either alone or together with other magnesium compounds, or organic magnesium compound manufactured by halogenating organic magnesium compounds with compounds containing chlorine. For convenience of reference, the halogenated titanium-containing compound is referred to herein as "procatalyst" the organoaluminum compound, as "cocatalyst" and an electron donor compound, which is typically used separately or partially or totally complexed with the organoaluminum compound, as "selectivity control agent" (SCA). It is also known to incorporate electron donor compounds into the procatalyst. The electron donor which is incorporated with the titanium-containing compounds serves a different purpose than the electron donor referred to as the selectivity control agent. The compounds which are used as the electron donor may be the same or different compounds which are used as the selectivity control agent. The above-described stereoregular high activity catalysts are broadly conventional and are described in numerous patents and other references including Nestlerode et al, U.S. Pat. No. 4,728,705, which is incorporated herein by reference.

Kioka et al, U.S. Pat. No. 4,330,649, describe a solid catalyst component (procatalyst) obtained by heating a soluble magnesium compound such as magnesium chloride with a higher alcohol in the presence of an ester to produce a solution. This solution is added to titanium tetrachloride and an electron donor to form the procatalyst. Band, U.S. Pat. No. 4,472,521, reacts a magnesium alkoxide with excess titanium alkoxide, wherein each alkoxide has 4 or more carbons in the presence of aromatic hydrocarbon. Titanium tetrachloride and an electron donor are added to the resulting solution to produce a solid procatalyst which is post-treated with transition metal halide.

A number of the more attractive olefin polymerization procatalysts are produced from magnesium alkoxides wherein the alkoxide moieties have one or two carbon atoms. Magnesium ethoxide appears to be a particularly attractive procatalyst precursor. The use of magnesium ethoxide poses a somewhat unique problem in that, unlike most other magnesium alkoxides, magnesium ethoxide is only slightly soluble in the corresponding alkanol, i.e., ethanol. Various measures have been proposed for the solubilization of magnesium alkoxide including the formation of complex magnesium ethoxides as disclosed by Job, U.S. Pat. No. 4,710,482.

Several procedures have been disclosed which involve the solubilization of magnesium ethoxide by reaction with carbon dioxide in ethanol. Arzoumanidis, U.S. Pat. No. 4,540,679, produces an olefin polymerization catalyst component by contacting a suspension of magnesium ethoxide in ethanol with carbon dioxide. To the resulting solution is added an organoaluminum compound in hydrocarbon solution to produce granular particles which are employed as a support for the titanium species which result from contacting the granular particle with titanium tetrachloride. Nestlerode et al, U.S. Pat. No. 4,728,705, react magnesium ethoxide in ethanol with carbon dioxide to form a solution. This solution is spray dried to produce particles or alternatively is used to impregnate carrier particles. The particles resulting from either modification are useful in the production of an olefin polymerization procatalyst of particularly desirable morphology.

The reaction of magnesium ethoxide with carbon dioxide in ethanol produces a soluble complex containing moieties of magnesium, ethoxide and carbon monoxide which is often referred to as carbonated magnesium ethoxide ("CMEO"). The precise structure of the complex is somewhat uncertain but a low pressure stable form is believed to be illustrated by the formula

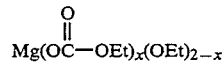

where x is a number from 1 to 2, and the complex is soluble in ethanol. Although the above references teach methods of converting this carbon dioxide-containing complex into olefin polymerization procatalysts and thence to olefin polymerization catalysts, it would be of advantage to provide improved olefin polymerization procatalysts and resulting catalysts from the carbonated magnesium ethoxide complex having improved activity, and increased selectivity for isotactic polypropylene.

SUMMARY OF THE INVENTION

The present invention relates to an improved olefin polymerization catalyst system and to a process of polymerizing α-olefins in the presence of such catalyst.

More particularly, the present invention relates to a procatalyst precursor for the polymerization catalyst system used in polymerizing one or more α-olefins. The catalyst precursor is prepared by contacting, at elevated temperature, (a) a carbonated magnesium alkoxide of the general formula

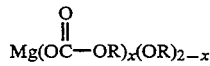

wherein R is a hydrocarbyl group having up to 12 carbon atoms and x is a number from 0.1 to about 2; and (b) at least one halogenating compound which is a non-transition metal halogenated compound or a non-metallic halogenated compound. Optionally, the components are contacted in the presence of an inert diluent, such as a hydrocarbon, halohydrocarbon or mixtures thereof.

Further, the invention is a process for the production of polymers using the high activity olefin polymerization catalyst system obtained by contacting (a) an olefin procatalyst obtained by contacting (i) the catalyst precursor, (ii) a tetravalent titanium halide, and (iii) an electron donor, with (b) an organoaluminum cocatalyst; and (c) a selectivity control agent.

DESCRIPTION OF THE INVENTION

The present invention contemplates the production of an olefin polymerization procatalyst precursor by contacting carbonated magnesium alkoxide and at least one halogenating compound which is a non-transition metal halogenated compound or a non-metallic halogenated compound, at an elevated temperature. Optionally, the carbonated magnesium alkoxide and the halogenating compound are contacted at elevated temperature in the presence of an inert diluent such as a hydrocarbon, halohydrocarbon or mixtures thereof, to produce, as a new solid material, the polymerization procatalyst precursor. The procatalyst precursor is contacted with tetravalent titanium halide, optional inert diluent, such as a hydrocarbon, halohydrocarbon or mixtures thereof, and an electron donor to produce the procatalyst as spheroidal particles. Contacting the procatalyst with an organoaluminum compound cocatalyst and a selectivity control agent results in the production of high activity olefin polymerization catalyst system which is useful in the polymerization of lower e-olefins to polymeric product having good properties, such as low xylene solubles and high bulk density.

The carbonated magnesium alkoxide employed in the preparation of the procatalyst precursor is of the general formula

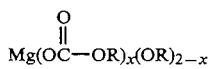

wherein R is a hydrocarbyl group having up to 12 carbon atoms and x is a number from about 0.1 to about 2. The hydrocarbyl group is alkyl such as methyl or ethyl, aryl such as phenyl or naphthyl, alkaryl such as p-tolyl or ethylphenyl, or aralkyl such as phenethyl or benzyl. It is preferred that R is alkyl of up to 6 carbon atoms, with alkyl of up to 3 carbon atoms being more preferred. Examples of suitable carbonated magnesium alkoxides include carbonated magnesium methoxide, carbonated magnesium ethoxide, carbonated magnesium propoxide, carbonated magnesium butoxide, carbonated magnesium phenoxide, carbonated magnesium phenethoxide, and carbonated magnesium p-toloxide. Carbonated magnesium ethoxide is preferred.

The production of a carbonated magnesium ethoxide solution in ethanol is generally known in the art, inter alia, from the disclosures of the above U.S. Pat. No. 4,540,679 and U.S. Pat. No. 4,728,705 references. In general, the process of producing the carbonated magnesium ethoxide solution comprises the passing of carbon dioxide into a slurry of magnesium ethoxide or magnesium metal, and silica in ethanol, such as by bubbling the gaseous carbon dioxide through the slurry or by adding dry ice. The magnesium ethoxide is "solubilized" by interaction with the carbon dioxide and ethanol, probably through the formation of a complex carbonated alcoholate of the general formula

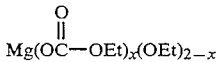

wherein x is a number from about 0.1 and to about 2 inclusive. Preferably x is a number from about 0.8 to about 2. The carbonated complex is soluble in ethanol and the course of the interaction is followed by observing the disappearance of the insoluble magnesium ethoxide.

According to the invention, the carbonated magnesium alkoxide, such as carbonated magnesium ethoxide, is contacted with one or more halogenating compounds, such as non-transition metal halogenated compounds or non-metallic halogenated compounds to produce a reaction product. Preferably, the non-transition metal halogenated compound or the non-metallic halogenated compound contains 1 to 6 halogen atoms, with 1 to 4 halogen atoms being more preferred. Exemplary halogen atoms include chlorine, bromine, iodine and fluorine. The preferred halogen is chlorine. The preferred non-transition metal halogenated compounds are compounds in which the metal is a Group IIIA or IVA metal such as aluminum, gallium, and tin, as defined by the Chemical Abstract Service Registry (CAS) in the Periodic Table of Elements. Group IVA metal compounds are more preferred.

Suitable chlorine-containing non-transition metal halogenated compounds include tin tetrachloride, aluminum trichloride and diethylaluminum chloride. Suitable chlorine-containing non-metallic halogenated compounds include thionyl chloride, hydrogen chloride, oxalyl chloride, carbonyl chloride, boron trichloride and carbon tetrachloride. The preferred halogenating compounds are thionyl chloride and tin tetrachloride. The use of thionyl chloride results in better yields and fewer xylene solubles and is therefore the more preferred halogenating compound. Sufficient halogenating compound is provided so that the molar ratio of chlorine to magnesium is from about 0.5 to about 50. It is preferred that the molar ratio of chlorine to magnesium is from about 1.5 to about 20, with a molar ratio from about 2 to about 10 being more preferred.

Optionally, the carbonated magnesium alkoxide, such as carbonated magnesium ethoxide, and at least one halogenating compound are contacted at elevated temperature in the presence of an inert diluent, such as a hydrocarbon, halohydrocarbon or mixtures thereof, in which the halogenating compound is soluble but the reaction product thereof is insoluble. Suitable inert diluents include hydrocarbons, such as isooctane, isopentane and mixtures thereof, aromatic hydrocarbons such as benzene, toluene, xylene and mixtures thereof, and aromatic halohydrocarbons such as chlorobenzene, dichlorobenzene, bromobenzene and mixtures thereof. The preferred inert diluents are toluene and chlorobenzene.

The olefin polymerization procatalyst precursor is obtained by heating a mixture of the carbonated magnesium ethoxide and at least one halogenating compound, and optional hydrocarbon diluent. If necessary, mixing of the mixture is facilitated by conventional procedures such as shaking or stirring the mixture in a conventional apparatus. The mixture is heated to an elevated temperature from about 40° C. to about 150° C. and held at such temperature for a sufficient period of time to permit substantial halogenation (e.g. chlorination) of the carbonated magnesium alkoxide. Heating the mixture at an elevated temperature from about 50° C. to about 115° C. is preferred, with from about 50° C. to about 80° C. being more preferred. It is preferred that the mixture is heated for a period of time in the range of about 5 minutes to about 180 minutes, with a period of time in the range of 15 minutes to 70 minutes being more preferred. The resulting solid procatalyst precursor is recovered by filtration or decantation. This solid procatalyst precursor is typically washed with a light hydrocarbon such as isooctane or isopentane and dried, although the recovered solid may be used in the production of procatalyst without additional treatment.

The olefin polymerization procatalyst is produced by contact of the solid procatalyst precursor with a halogenated tetravalent titanium halide in the presence of an optional inert diluents and an electron donor. The halogenated tetravalent titanium halide contains at least two halogen atoms, and preferably contains four halogen atoms. The halogen atoms are chlorine atoms, bromine atoms, iodine atoms, or fluorine atoms. The tetravalent titanium compounds have up to two alkoxy or aryloxy groups. Examples of suitable tetravalent titanium compounds include diethoxytitanium dichloride, dihexloxytitanium dibromide, isopropoxytitanium trichloride, phenoxytitanium trichloride, tetravalent titanium halide such as titanium tetrachloride or titanium tetrabromide. The preferred tetravalent titanium halide is titanium tetrachloride.

It is preferred that the optional inert diluent employed in the production of the olefin polymerization procatalyst is a hydrocarbon of up to 12 carbon atoms inclusive, more preferably of up to 9 carbon atoms inclusive. Exemplary hydrocarbons include isooctane, isopentane, toluene, benzene and hexane. Preferably the hydrocarbon is a halohydrocarbon of up to 9 carbon atoms, inclusive, which contains at least one halogen atom, preferably chlorine or bromine, and in the case of aliphatic halohydrocarbons contain at least 2 halogen atoms. Exemplary aliphatic halohydrocarbons are methylene chloride, methylene bromide, chloroform, carbon tetrachloride, 1,2-dibromoethane, 1,1,3-trichloropropane, trichlorocyclohexane, dichlorofluoromethane and tetrachloroisooctane. Suitable aromatic halo-hydrocarbons include chlorobenzene, bromobenzene, dichlorobenzene and chlorotoluene. Of the aliphatic halo-hydrocarbons, carbon tetrachloride and 1,1,2-trichloroethane are preferred. The preferred hydrocarbons are chlorobenzene, chlorotoluene, isopentane and toluene.

The electron donors which are suitably included within the procatalyst are the generally conventional electron donors employed in titanium-based olefin polymerization procatalysts including ethers, esters, ketones, amines, imines, nitriles, phosphines, stibines, arsines and alcoholates. The preferred electron donors are esters and particularly aliphatic esters of aromatic monocarboxylic or dicarboxylic acids. Examples of such preferred electron donors are methyl benzoate, ethyl benzoate, ethyl p-ethoxybenzoate, ethyl p-methylbenzoate, diethyl phthalate, diisobutyl phthalate, diisopropyl terephthalate and dimethyl enaphthalenedicarboxylate. The electron donor is a single compound or a mixture of two or more compounds but preferably the electron donor is provided as a single compound. Of the preferred ester electron donors, ethyl benzoate and diisobutyl phthalate are particularly preferred. Sufficient electron donor is provided so that the molar ratio of electron donor to magnesium in the procatalyst is from about 0.02 to about 0.03. It is preferred that the molar ratio of electron donor to magnesium in the procatalyst is from about 0.03 to about 0.2, with a molar ratio from about 0.03 to about 0.16 being more preferred.

The manner by which the solid procatalyst precursor, tetravalent titanium halide, the optional inert diluent and the electron donor are contacted is material but not critical and is generally conventional. In one embodiment the procatalyst precursor and the tetravalent titanium halide are mixed and the electron donor is subsequently added to the resulting mixture. In a preferred embodiment, the electron donor and procatalyst precursor are mixed with the tetravalent titanium halide or a mixture of tetravalent titanium halide and optional inert diluent and the resulting solid is washed one or more additional times with tetravalent titanium halide or the mixture of tetravalent titanium halide and inert diluent. The initial contacting of electron donor, procatalyst precursor and tetravalent titanium halide-/optional inert diluent mixture is suitably conducted at a temperature from about ambient to about 150° C. Better interaction of these materials is obtained if they are heated and initial contacting temperatures from about 70° C. to about 130° C. are preferred, with temperatures from about 75° C. to about 110° C. being more preferred.

In another preferred embodiment, a portion of the electron donor to be added in the formation of the procatalyst is added during the formation of the procatalyst precursor. In particular, the carbonated magnesium ethoxide and the chlorinating compound are contacted at elevated temperature in the presence of one or more electron donors and optional inert diluent. Sufficient electron donor is provided such that the molar ratio of electron donor to magnesium in the procatalyst is from about 0.006 to about 0.4, preferably from about 0.03 to about 0.20. The preferred electron donors are ethyl benzoate and diisobutyl phthalate.

Contacting of the procatalyst precursor with the halogenated tetravalent titanium compound is effected by using an excess of the titanium compound. At least 2 moles of the titanium compound should ordinarily be used per mole of the magnesium compound. Preferably from 4 moles to 100 moles of the titanium compound are used per mole of the magnesium compound, and most preferably from 8 moles to 20 moles of the titanium compound are used per mole of the magnesium compound. The contacting or reaction is conducted in one or more operations, each of which is conducted over a period of time ranging from a few minutes to several hours. Usually the reaction is allowed to proceed over 0.1 to 6 hours, preferably from about 0.5 to about 3.5 hours.

During each contacting with tetravalent titanium halide a portion of the inert diluent is optionally present and the reaction is facilitated on some occasions by the additional presence of an acid halide such as benzoyl chloride or phthaloyl chloride. The solid procatalyst, obtained as spherical particles, is typically finished by a final wash with an inert hydrocarbon of up to 10 carbon atoms and drying in an inert environment, such as under an inert gas (e.g. nitrogen or air). Exemplary of the inert hydrocarbons that are suitable for the washing are isopentane, isooctane, hexane, heptane and cylohexane.

A preferred final washed product has a titanium content of from 0.5 percent by weight to 6.0 percent by weight. A more preferred final washed product from 2.0 percent by weight to 4.0 percent by weight. The atomic ratio of titanium to magnesium in the final product is between 0.01:1 and 0.2:1, preferably between 0.04:1 and 0.1:1. The procatalyst so obtained is storage stable so long as water and other active hydrogen compounds are excluded. Alternatively, however, the procatalyst is used as obtained directly from the hydrocarbon wash without the need for drying. The procatalyst is used in the production of olefin polymerization catalyst by contact of the procatalyst with organoaluminum cocatalyst and a selectivity control agent.

The cocatalyst is an organoaluminum compound which is selected from the aluminum-based cocatalysts conventionally employed with titanium-based procatalysts. Illustrative organoaluminum compounds are trialkylaluminum compounds, and alkylaluminum halide compounds wherein each alkyl independently has from 2 to 6 carbon atoms inclusive. The preferred organoaluminum compounds are halide free and particularly preferred are the trialkyl-aluminum compounds such as triethylaluminum, triisobutyl-aluminum, triisopropylaluminum and diethylhexylaluminum. Triethylaluminum is the preferred member of the class of trialkylaluminum compounds. The cocatalyst is employed in a sufficient quantity to provide a ratio of aluminum atoms to titanium atoms in the procatalyst from about 1:1 to about 300:1 but preferably from about 10:1 to about 100:1.

The selectivity control agents which are employed in the production of the olefin polymerization catalyst are those conventionally employed in conjunction with titanium-based procatalysts and organoaluminum cocatalysts. Suitable selectivity control agents include those electron donors as listed previously for use in procatalyst production but also include organosilane compounds of the formula

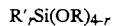

$$R'_r Si(OR)_{4-r}$$

wherein R' is alkyl or aryl of up to 12 carbon atoms inclusive, R is lower alkyl of up to 4 carbon atoms inclusive and r is 0 to 3. It is preferred that R' is alkyl of up to 6 carbon atoms and r is 1 or 2.

It is preferred that the selectivity control agent is an ester such as an aromatic monocarboxylic acid ester or aromatic dicarboxylic acid ester, or an organosilane, such as alkylalkoxysilanes and arylalkoxysilanes. Illustrative of the suitable selectivity control agents are esters such as ethyl p-ethoxybenzoate, diisobutyl phthalate, ethyl benzoate and ethyl p-methylbenzoate, and organosilanes such as diisobutyldimethoxysilane, n-propyltrimethoxysilane, isopropyltrimethoxysilane, ethyltriethoxysilane and cyclohexylmethyldimethoxysilane. The selectivity control agent is provided in a quantity sufficient to provide from about 0.01 mole to about 100 moles per mole of titanium in the procatalyst. It is preferred that the selectivity control agent is provided in a quantity sufficient to provide from about 0.5 mole to about 70 moles per mole of titanium in the procatalyst, with about 8 moles to about 50 moles being more preferred.

The components of the olefin polymerization catalyst are usefully contacted by mixing in a suitable reactor outside the system in which α-olefin is to be polymerized and the catalyst thereby produced is subsequently introduced into the polymerization reactor. Alternatively, however, the catalyst components are introduced separately into the polymerization reactor. As another alternative, two of the components are partially or completely mixed with each other (e.g. premixing selectivity control agent and triethylaluminum) prior to being introduced into the polymerization reactor.

The olefin polymerization catalyst of the invention is useful in the polymerization of α-olefins and particularly in the polymerization of straight-chain α-olefins of up to 20 carbon atoms, inclusive, e.g., propylene, 1-butene, dodecane, or mixtures thereof. It is preferred that α-olefins of 3 carbon atoms to 10 carbon atoms, such as propylene, butene-1 and pentene-1 and hexane-1, are homopolymerized.

The particular type of polymerization process utilized is not critical to the operation of the present invention and the polymerization processes now regarded as conventional are suitable in the process of the invention. The polymerization is conducted under polymerization conditions as a liquid phase or as a gas-phase process employing a fluidized catalyst bed.

The polymerization conducted in the liquid phase under polymerization conditions and employs as reaction diluent an added inert liquid diluent or alternatively a liquid diluent which comprises the olefin, such as propylene or 1-butene, undergoing polymerization. If a copolymer is prepared wherein ethylene is one of the monomers, ethylene is introduced by conventional means. Typical polymerization conditions include a reaction temperature from about 25° C. to about 125° C. with temperatures from about 35° C. to about 90° C. being preferred and a pressure sufficient to maintain the reaction mixture in a liquid phase. Such pressures are from about 150 psi to about 1200 psi, with pressures from about 250 psi to about 900 psi are preferred. The liquid phase reaction is operated in a batchwise manner or as a continuous or semi-continuous process. Subsequent to reaction, the polymer product is recovered by conventional procedures. The precise controls of the polymerization conditions and reaction parameters of the liquid phase process are within the skill of the art.

As an alternate embodiment of the invention, the polymerization may be conducted in a gas phase process in the presence of a fluidized catalyst bed. One such gas phase process polymerization process is described in Goeke et al, U.S. Pat. No. 4,379,759, incorporated herein by reference. The gas phase process typically involves charging to reactor an amount of preformed polymer particles, gaseous monomer and separately charge a lesser amount of each catalyst component. Gaseous monomer, such as propylene, is passed through the bed of solid particles at a high rate under conditions of temperature and pressure sufficient to initiate and maintain polymerization. Unreacted olefin is separated and recycled. Polymerized olefin particles are collected at a rate substantially equivalent to its production. The process is conducted in a batchwise manner or a continuous or semi-continuous process with constant or intermittent addition of the catalyst components and/or α-olefin to the polymerization reactor. Preferably the process is a continuous process. Typical polymerization temperatures for a gas phase process are from about 30° C. to about 120° C. and typical pressures are up to about 1000 psi, with pressures from about 100 to about 500 psi being preferred.

In both the liquid phase and the gas-phase polymerization processes, molecular hydrogen is added to the reaction mixture as a chain transfer agent to regulate the molecular weight of the polymeric product. Hydrogen is typically employed for this purpose in a manner well known to persons skilled in the art. The precise control of reaction conditions, and the rate of addition of feed component and molecular hydrogen is broadly within the skill of the art.

The polymerization product is suitably a homopolymer as when a single α-olefin monomer is provided to the polymerization process. Alternatively, the process is useful for the production of copolymers or terpolymers as when two or more α-olefins are provided to the polymerization process of the invention such as in the production of EPR or polypropylene impact copolymers.

Other features, advantages and embodiments of the invention disclosed herein will be readily apparent to those exercising ordinary skill after reading the foregoing disclosure. In this regard, while specific embodiments of the invention have been described in detail, variations and modifications of these embodiments can be effected without departing from the spirit and scope of the invention as described and claimed.

ILLUSTRATIVE EMBODIMENT I

In an 8-ounce reaction bottle 4.5 g of a carbonated magnesium ethoxide containing silica (19 mmols magnesium) and 150 ml of chlorobenzene were mixed under dry nitrogen atmosphere. To the mixture was added 3 ml (26 mmol) of tin tetrachloride. The reaction mixture was heated to about 110° C. for about 60 minutes. The resulting slurry was filtered and the solids were washed with isooctane three times and dried under nitrogen.

ILLUSTRATIVE EMBODIMENT II

To 4.5 g (19 mmol Mg) of carbonated magnesium ethoxide in 115 ml of chlorobenzene, 1.5 ml (20.6 mmol) of thionyl chloride was added under dry nitrogen atmosphere. The mixture was stirred at 70° C. for 1 hour and then filtered hot. The resulting solid was washed with isooctane three times and dried under nitrogen.

ILLUSTRATIVE EMBODIMENT III 2.5 g (19 mmol) aluminum chloride was added to 4.5 g (19 mmol of Mg) of carbonated magnesium ethoxide in 115 ml of chlorobenzene. The mixture was stirred at 110° C. for 1 hour and then filtered hot. The resulting solid was washed three times with isooctane and dried under nitrogen.

ILLUSTRATIVE EMBODIMENT IV

To 4.5 g (19 mmol of Mg) of carbonated magnesium ethoxide containing silica in 115 ml of chlorobenzene 1.5 ml (21 mmol) of thionyl chloride was added. The mixture was stirred at 110° C. for 120 minutes and then filtered hot, and dried under nitrogen.

Comparative Catalyst Precomponents 4.5 g (19 mmol of Mg) of carbonated magnesium ethoxide was placed in 115 ml of chlorobenzene. The mixture was stirred and a catalyst prepared according to the preparative steps set forth below in Illustrative Embodiment V. The catalyst was used in the Comparative of Table I.

ILLUSTRATIVE EMBODIMENT V

Preparation of Procatalyst And Then Catalyst

The procatalyst precursor product of Illustrative Embodiments I, II, III, IV and the comparative catalyst were stirred with diisobutyl phthalate in a volume of 55 ml of a 50/50 by (vol/vol) mixture of titanium tetrachloride/chlorobenzene for every 19 mmoles of magnesium precursor for 1 hour at 110° C. The resulting mixture was filtered while hot and the solids recovered. 60 ml portions of the 50/50 mixture was added to the solid and stirred at 110° C. for 60 minutes. The resulting slurry was filtered and slurried again in 60 ml of fresh 50/50 mixture. The resulting slurry was stirred at 110° C. for 30 minutes. The solids were rinsed six times with 125 ml of isooctane at room temperature, and then dried overnight under flowing nitrogen.

Each procatalyst was converted to an olefin polymerization catalyst by mixing with triethylaluminum cocatalyst and n-propyltrimethoxysilane as selectivity control agent. The catalysts were employed to polymerize propylene in a slurry-phase process in liquid propylene as diluent. The polymerizations took place in a 1-gallon autoclave for 1 hour at 67° C. with 43 mmol of added hydrogen. Sufficient catalyst components were provided to give an Al/Si/Ti molar ratio of 100/25/1.

The results of these polymerizations are shown in Table I wherein "Productivity" refers to the yield of polypropylene polymer in MMg of polymer/g of titanium in procatalyst/hour. The stereospecificity of the catalyst is measured by determining the percent by weight of xylene solubles (termed XS) in accordance with the regulations of the U.S. Food and Drug Administration Regulation, 21 C.F.R. 177.1520. The xylene soluble portion consists primarily of amorphous (atactic) polymer with a small amount of low molecular weight crystalline polymer.

TABLE I

| Precursor[1] Source | Chlorinating Compound | Ti (% wt) | Yield (MMgPP/g-Ti-hr) | XS (% wt) |
|---|---|---|---|---|
| II | SOCl$_2$ | 1.8 | 1.4 | 2.0 |
| II | SOCl$_2$ | 1.8 | 1.3 | 1.9 |
| II | SOCl$_2$ | 1.8 | 1.4 | 2.1 |
| IV[2] | SOCl$_2$ | 2.2 | 1.4 | 2.0 |
| IV[2] | SOCl$_2$ | 2.1 | 1.6 | 2.0 |
| C | — | 2.5 | 0.96 | 2.8 |
| C | — | 2.5 | 1.1 | 2.8 |
| C | — | 2.3 | 1.1 | 2.6 |
| I | SnCl$_4$ | 2.6 | 0.38 | 2.3 |
| I | SnCl$_4$ | 2.5 | 0.36 | 2.3 |
| III | AlCl$_3$ | 2.2 | 0.89 | 8.8 |
| III | AlCl$_3$ | 2.7 | 0.71 | 9.6 |

[1]Precursor source corresponds to Illustrative Embodiments I through IV, wherein C is a Comparative Catalyst.
[2]The precursor was not washed with isooctane after filtration.

We claim:

1. An olefin polymerization procatalyst precursor used in producing a high activity catalyst obtained by contacting at an elevated temperature in the presence of an inert diluent:

(a) a carbonated magnesium alkoxide of the general formula

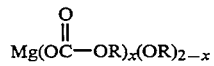

$$Mg(OC\text{---}OR)_x(OR)_{2-x}$$

wherein R is a hydrocarbyl group having up to 12 carbon atoms and x is a number from about 0.1 to about 2; and (b) at least one halogenating compound selected from the group consisting of non-transition metal halogenated compounds which are aluminum trichloride and tin tetrachloride, and non-metallic halogenated compounds which are thionyl chloride, hydrogen chloride, oxalyl chloride, carbonyl chloride, boron trichloride, phosphorous oxychloride, and carbon tetrachloride.

2. The procatalyst precursor according to claim 1, wherein the carbonated magnesium alkoxide is carbonated magnesium ethoxide.

3. The procatalyst precursor of claim 2 wherein the inert diluent is a hydrocarbon, halohydrocarbon, or mixtures thereof.

4. An olefin procatalyst obtained by contacting a tetravalent titanium halide, an electron donor, and a procatalyst precursor obtained by contacting at an elevated temperature in the presence of an inert diluent:

(a) a carbonated magnesium alkoxide of the general formula $$Mg(OC(=O)-OR)_x(OR)_{2-x}$$

wherein R is a hydrocarbyl group having up to 12 carbon atoms and x is a number from about 0.1 to about 2; and (b) at least one halogenating compound selected from the group consisting of non-transition metal halogenated compounds which are aluminum trichloride and tin tetrachloride, and non-metallic halogenated compounds which are thionyl chloride, hydrogen chloride, oxalyl chloride, carbonyl chloride, boron trichloride, phosphorus oxychloride, and carbon tetrachloride.

5. The procatalyst according to claim 4 wherein the carbonated magnesium alkoxide is carbonated magnesium ethoxide.

6. The procatalyst of claim 4 wherein the tetravalent titanium halide, electron donor and procatalyst precursor are contacted in the presence of an inert diluent.

7. The procatalyst of claim 6 wherein the diluent is a hydrocarbon, halohydrocarbon, or mixtures thereof.

8. The procatalyst of claim 7 wherein the inert diluent is a halohydrocarbon.

9. An olefin polymerization catalyst produced by contacting the procatalyst of claim 4 with an organoaluminum cocatalyst and a selectivity control agent.

10. An olefin polymerization catalyst produced by contacting the procatalyst of claim 6, an organoaluminum cocatalyst and a selectivity control agent.

11. The olefin polymerization catalyst of claim 9 wherein the selectivity control agent is an ester of an aromatic monocarboxylic or dicarboxylic acid or an organosilane compound of the formula $$R'_r Si(OR)_{4-r}$$

wherein R' is alkyl or aryl of up to 12 carbon atoms, R is lower alkyl of up to 4 carbon atoms, and r is 0 to 3.

12. The olefin polymerization catalyst of claim 11 wherein the selectivity control agent is an organosilane.

13. The olefin polymerization catalyst of claim 12 wherein the organosilane is diisobutyldimethoxysilane.

14. The olefin polymerization catalyst of claim 12 wherein the organosilane is n-propyltrimethoxysilane.

* * * * *

REEXAMINATION CERTIFICATE (3260th)

United States Patent [19]

Wilson et al.

[11] B1 5,411,926

[45] Certificate Issued Jul. 8, 1997

[54] OLEFIN POLYMERIZATION CATALYST

[75] Inventors: Stanley E. Wilson, Houston; Richard A. Kemp, Stafford, both of Tex.

[73] Assignee: Shell Polypropylene Company, Houston, Tex.

Reexamination Request:
No. 90/004,340, Aug. 21, 1996

Reexamination Certificate for:
Patent No.: 5,411,926
Issued: May 2, 1995
Appl. No.: 193,302
Filed: Feb. 8, 1994

Related U.S. Application Data

[63] Continuation of Ser. No. 969,652, Oct. 30, 1992, abandoned.
[51] Int. Cl.$^6$ .................................... B01J 31/00
[52] U.S. Cl. ................ 502/117; 502/119; 502/120; 502/122
[58] Field of Search ................ 502/122, 120, 502/119, 117

[56] References Cited

U.S. PATENT DOCUMENTS 5,122,490  6/1992  Uwai et al. ................ 502/113
5,223,466  6/1993  Lee et al. ................ 502/120

*Primary Examiner*—Shrive P. Beck

[57] ABSTRACT

A high activity olefin polymerization catalyst catalyzes the production of polymeric lower α-olefin having good properties. The catalyst is produced from an organoaluminum cocatalyst, a selectivity control agent and a novel olefin polymerization procatalyst which is prepared by contacting a tetravalent titanium halide, an optional inert diluent, an electron donor and a novel solid procatalyst precursor obtained by contacting (a) a carbonated magnesium alkoxide of the general formula $$Mg(OC(=O)-OR)_x(OR)_{2-x}$$

wherein R is a hydrocarbyl group having up to 12 carbon atoms and x is a number from 0.1 to about 2; and (b) at least one halogenating compound which is a non-transition metal halogenated compound or non-metallic halogenated compound. A process for polymerizing one or more α-olefins utilizing the novel high activity polymerization catalyst.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 4 are determined to be patentable as amended.

Claims 2–3 and 5–14, dependent on an amended claim, are determined to be patentable.

New claims 15–18 are added and determined to be patentable.

1. An olefin polymerization procatalyst precursor used in producing a high activity catalyst obtained by contacting at an elevated temperature in the presence of an inert diluent:
   (a) a carbonated magnesium alkoxide of the general formula

wherein R is a hydrocarbyl group having up to 12 carbon atoms and x is a number from about 0.1 to about 2; and
   (b) at least one halogenating compound selected from the group consisting of non-transition metal halogenated compounds which are aluminum trichloride and tin tetrachloride, and non-metallic halogenated compounds which are thionyl chloride, hydrogen chloride, oxalyl chloride, carbonyl chloride, boron trichloride, *and* phosphorous oxychloride[, and carbon tetrachloride].

4. An olefin procatalyst obtained by contacting a tetravalent titanium halide, an electron donor, and a procatalyst precursor obtained by contacting at an elevated temperature in the presence of an inert diluent
   (a) a carbonated magnesium alkoxide of the general formula

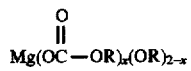

wherein R is a hydrocarbyl group having up to 12 carbon atoms and x is a number from about 0.1 to about 2; and
   (b) at least one halogenating compound selected from the group consisting of non-transition metal halogenated compounds which are aluminum trichloride and tin-tetrachloride, and non-metallic halogenated compounds which are thionyl chloride, hydrogen chloride, oxalyl chloride, carbonyl chloride, boron trichloride, *and* phosphorous oxychloride[, and carbon tetrachloride].

*15. A procatalyst precursor according to claim 1 wherein the halogenating compound is thionyl chloride.*

*16. A procatalyst precursor according to claim 1 wherein the halogenating compound is tin tetrachloride.*

*17. A procatalyst precursor according to claim 4 wherein the halogenating compound is thionyl chloride.*

*18. A procatalyst precursor according to claim 4 wherein the halogenating compound is tin tetrachloride.*

* * * * *